(12) United States Patent
Kim

(10) Patent No.: US 8,545,078 B2
(45) Date of Patent: Oct. 1, 2013

(54) SOLAR LIGHTING APPARATUS WITH HYBRID SOLAR LIGHT DIFFUSER HAVING DIFFUSION-REFRACTION AND DIFFUSION-REFLECTION FUNCTIONS

(75) Inventor: Byung Chul Kim, Busan (KR)

(73) Assignee: ABM Greentech Co., Ltd., Busan (KR)

( * ) Notice: Subject to any disclaimer, the term of this patent is extended or adjusted under 35 U.S.C. 154(b) by 188 days.

(21) Appl. No.: 13/239,099

(22) Filed: Sep. 21, 2011

(65) Prior Publication Data

US 2012/0243252 A1 Sep. 27, 2012

(30) Foreign Application Priority Data

Mar. 24, 2011 (KR) .......................... 10-2011-0026245

(51) Int. Cl.
*E04D 13/00* (2006.01)

(52) U.S. Cl.
USPC .................. 362/576; 362/1; 362/2; 362/147; 362/148; 362/149; 362/150; 362/551; 362/554; 362/558

(58) Field of Classification Search
USPC ................. 362/1, 2, 147–150, 551, 554, 558, 362/576
See application file for complete search history.

(56) References Cited

U.S. PATENT DOCUMENTS

| 4,141,058 A | * | 2/1979 | Mizohata et al. | 362/558 |
| 2008/0043466 A1 | * | 2/2008 | Chakmakjian et al. | 362/237 |
| 2011/0141570 A1 | * | 6/2011 | Rillie et al. | 359/598 |

FOREIGN PATENT DOCUMENTS

KR 20-0318554 6/2003

* cited by examiner

*Primary Examiner* — Robert May
*Assistant Examiner* — Tsion Tumebo
(74) *Attorney, Agent, or Firm* — Birch, Stewart, Kolasch & Birch, LLP

(57) ABSTRACT

A solar lighting apparatus uses optical fibers to transmit solar light for illumination. The apparatus includes a support frame, optical fibers, a hybrid solar light diffuser and a reflective sheet. The optical fibers are fastened to the support frame and are spaced apart from each other at regular intervals. The hybrid solar light diffuser is coupled to a lower portion of the support frame and includes a diffusion plate and diffusion lenses which are provided on the diffusion plate at positions corresponding to the respective optical fibers. Each diffusion lens has a width increasing from a top thereof to a bottom. An incident depression is formed in the upper end of each diffusion lens. A reflective surface is formed on the circumferential outer surface of each diffusion lens to diffuse and reflect solar light. The reflective sheet is applied to the lower surface of the support frame.

6 Claims, 6 Drawing Sheets

SOLAR LIGHTING APPARATUS WITH HYBRID SOLAR LIGHT DIFFUSER HAVING DIFFUSION-REFRACTION AND DIFFUSION-REFLECTION FUNCTIONS

BACKGROUND OF THE INVENTION

1. Field of the Invention

The present invention relates generally to solar lighting apparatuses and, more particularly, to a solar lighting apparatus which can diffuse and refract solar light, emitted from an end of an optical fiber, beyond a predetermined angle, and can diffuse and reflect some of the solar light.

2. Description of the Related Art

Generally, optical fibers made of glass or plastic are used to transmit solar light, that is, natural light, that is being focused on an area of a predetermined size or less, to a place to be illuminated. Such an optical fiber comprises a core and a cladding made of material having a refractive index less than that of the core. Solar light that enters a first end of the optical fiber is total-reflected on a boundary surface between the core and the cladding and is emitted out of a second end of the optical fiber towards the place where illumination is needed. The reason that optical fibers are used in apparatuses using solar light for illumination despite the fact that optical fibers are very expensive is that during optical transmission the optical loss rate can be minimized.

As such, the optical fiber has the advantage of the optical loss rate being minimized during optical transmission, but it is disadvantageous in that the light-receiving angle is limited to a predetermined degree because of the total-reflection characteristics of the optical fiber. Limiting the light-receiving angle of solar light entering the first end of the optical fiber implies that the angle of solar light emitted from the second end of the optical fiber is also limited. Thus, solar light emitted from the second end of the optical fiber is excessively focused on a specific portion of the place where illumination is needed. Such a phenomenon in which light emitted from the optical fiber is focused only on a specific portion is a fundamental problem of optical fiber. In this art, using a diffusion lens has been attempted in order to solve this problem. Representative examples were proposed in Korean Patent Registration No. 0401363 and Korean Utility Model Registration No. 0318554.

The construction that the former proposes is a construction such that solar light emitted from the end of the optical fiber is scattered-reflected by a lens. The construction proposed by the latter is such that light emitted from the end of the optical fiber is diffused by a lens the surface of which has been finely treated by sanding. According to these conventional techniques, solar light emitted from the end of the optical fiber can be somewhat diffused by the lens before being transmitted to a place where illumination is needed. However, the lenses used in the conventional techniques are typical convex lenses (an improved type of convex lenses). It is difficult for this lens structure to increase the angle at which solar light is diffused to the expected degree. Another practical method to solve this disadvantage is required.

PRIOR ART DOCUMENT

Patent Document (Patent Documents) Korean Utility Model Registration No. 0318554, Korean Patent Registration No. 0401363, Korean Patent Laid-open Publication No. 2009-0042756, Korean Patent Registration No. 0990851

SUMMARY OF THE INVENTION

Accordingly, the present invention has been made keeping in mind the above problems occurring in the prior art, and an object of the present invention is to provide a solar lighting apparatus which can diffuse and refract solar light, emitted from an end of an optical fiber, beyond a predetermined angle, and which can diffuse and reflect some of the solar light, emitted from the end of the optical fiber.

Another object of the present invention is to provide a solar lighting apparatus which includes an auxiliary artificial light source to complement solar light used as a main illumination means.

In order to accomplish the above objects, the present invention provides a solar lighting apparatus using optical fibers to transmit solar light for illumination, including: a support frame installed under a ceiling of a place to be illuminated; a plurality of optical fibers inserted through and fastened to the support frame, the optical fibers being spaced apart from each other at regular intervals; a hybrid solar light diffuser coupled to a lower portion of the support frame, the hybrid solar light diffuser including a diffusion plate, and a plurality of diffusion lenses provided on the diffusion plate at positions that are spaced apart from each other at regular intervals and correspond to the respective optical fibers, a number of diffusion lenses being equal to a number of optical fibers, each of the diffusion lenses having a width increasing from a top thereof to a bottom, with an incident depression formed in an upper end of each of the diffusion lenses that is spaced apart from an end of the corresponding optical fiber, the incident depression diffusing and refracting solar light, and a reflective surface formed on a circumferential outer surface of each of the diffusion lenses, the reflective surface diffusing and reflecting solar light; and a reflective sheet applied to a lower surface of the support frame.

Each of the diffusion lenses may have either a conical shape or a polypyramidal shape.

The circumferential outer surface of each of the diffusion lenses may comprise a curved surface.

The incident depression of each of the diffusion lenses may have a concave central portion.

The solar lighting apparatus may further include a side reflector provided between a sidewall of the support frame and the hybrid solar light diffuser.

The solar lighting apparatus may further include a plurality of artificial light sources in the support frame at positions spaced apart from each other at regular intervals.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described in detail with reference to the attached drawings. In the description of the embodiment of the present invention, a detailed explanation of contents that are not directly related to the technical characteristics of the present invention or are obvious to those skilled in this art will be omitted.

Figure 1:
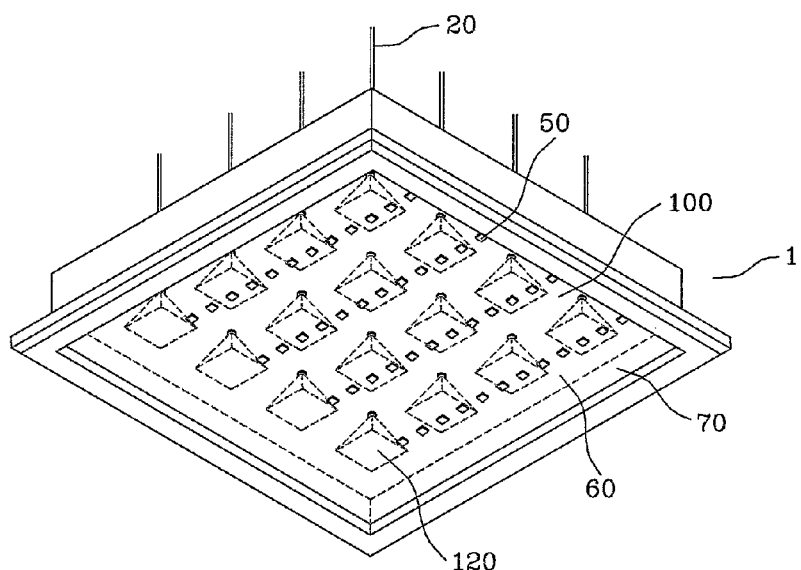
FIG. 1 is a schematic view showing the appearance of a solar lighting apparatus, according to an embodiment of the present invention.
Figure 2:
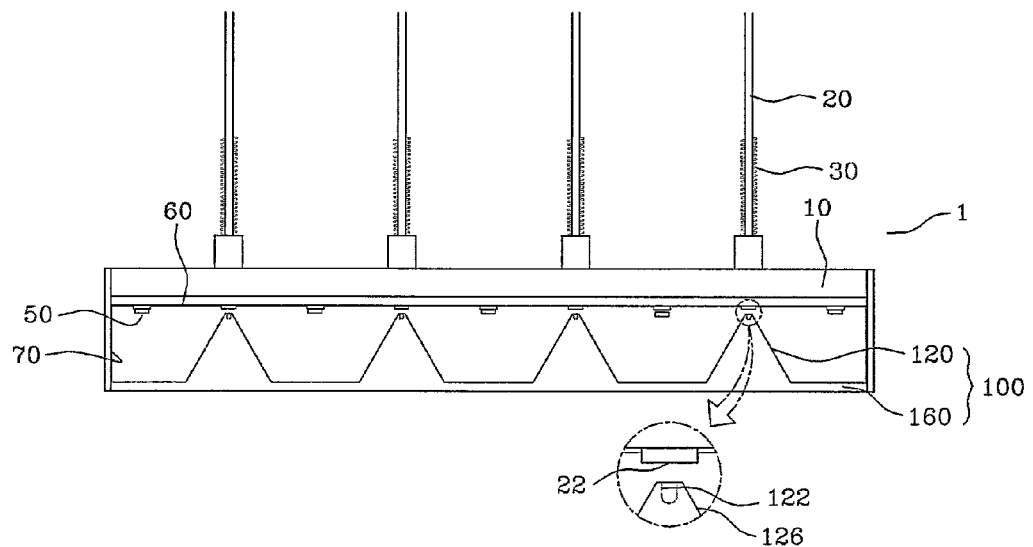
FIG. 2 is a schematic sectional view of the solar light illuminator of FIG. 1.

FIG. 1 is a schematic view showing the appearance of a solar lighting apparatus, according to an embodiment of the present invention. FIG. 2 is a schematic sectional view of the solar light illuminator of FIG. 1. As shown in the drawings, the solar lighting apparatus 1 according to the present invention basically includes a support frame 10, optical fibers 20 and a hybrid solar light diffuser 100.

The support frame 10 is a main body that supports the components of the solar lighting apparatus 1. Preferably, the support frame 10 is disposed above a place where illumination is needed, for example, it is typically installed under the ceiling of a room of a building structure. Of course, the outer surface of the support frame 10 may be covered with either metal or synthetic resin.

Each optical fiber 20 is a means for transmitting solar light collected by a light collector (not shown) to a desired illumination place in a state of natural light. The optical fibers 20 are inserted through the support frame 10 and are fastened to the support frame 10. An end 22 of each optical fiber 20 protrudes downwards from a lower surface of the support frame 10 by a predetermined distance. Each optical fiber 20 according to the present invention comprises either a glass optical fiber or a plastic optical fiber. In the drawings, the reference numeral 30 denotes an elastic member for preventing the optical fiber from being damaged by excessively bending. A typical spring is preferably used as the elastic member.

The hybrid solar light diffuser 100 is a means for diffusion-refracting and diffusion-reflecting solar light, which comes out of the end 22 of the optical fiber 20, at a predetermined angle or more. The hybrid solar light diffuser 100 may comprise only diffusion lenses 120. Alternatively, as shown in the drawings, the hybrid solar light diffuser 100 may comprise a combination of a planar diffusion plate 160 and a plurality of diffusion lenses 120 which are spaced apart from the diffusion plate 160 by a predetermined distance. In both cases, the number of diffusion lenses 120 is preferably the same as the number of optical fibers 20. Furthermore, in the case of the hybrid solar light diffuser 100 comprising the combination of the diffusion plate 160 and the diffusion lens 120, the diffusion plate 160 may be integrated with the diffusion lens 120 or, alternatively, they may be configured in such a way that they are manufactured by separate processes and then assembled with each other.

Figure 4A:
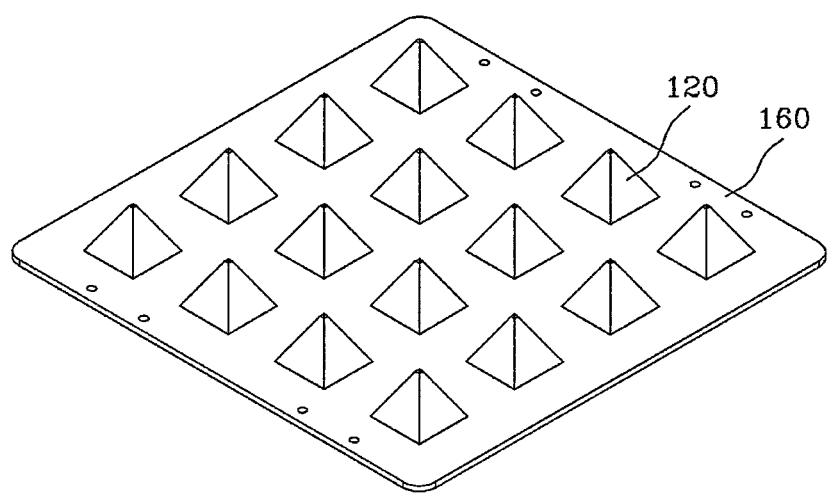
FIG. 4A is a schematic view showing the construction of an embodiment of a hybrid solar light diffuser according to the present invention.
Figure 4B:
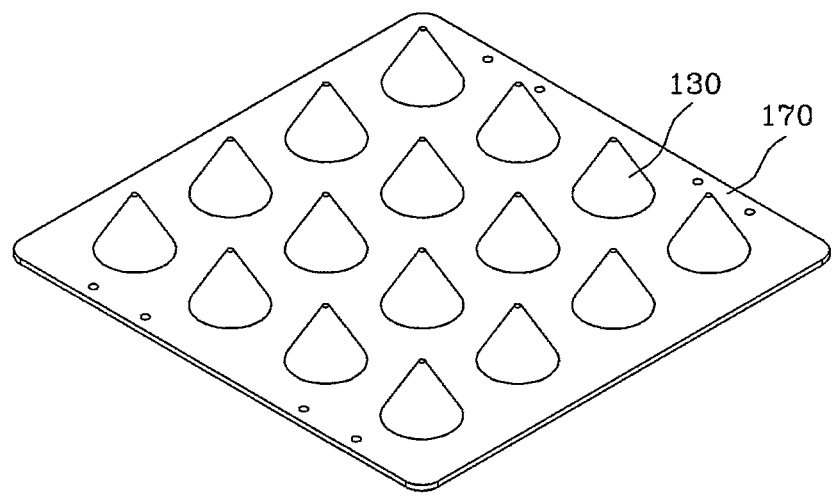
FIG. 4B is a schematic view showing the construction of another embodiment of a hybrid solar light diffuser according to the present invention.
Figure 4C:
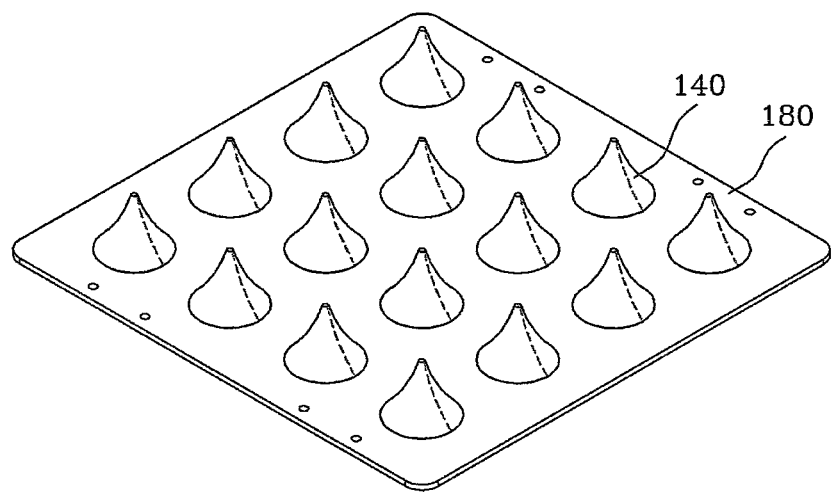
FIG. 4C is a schematic view showing the construction of a further embodiment of a hybrid solar light diffuser according to the present invention.

Each diffusion lens 120 is preferably configured such that the width thereof increases from the top to the bottom to diffusion-refract solar light that comes out of the end 22 of the optical fiber 20 at a predetermined light distribution angle, to a wider angle when emitting the solar light to the place where illumination is needed. For this, the diffusion lens 120 has a conical or polypyramidal shape. FIGS. 4A through 4C respectively illustrate a quadrangular pyramidal diffusion lens, a conical diffusion lens, and a conical diffusion lens, the circumferential outer surface of which has a predetermined radius of curvature. In the drawings, the reference numerals 170 and 180 denote diffusion plates.

Further, an incident depression 122 for diffusing and refracting solar light is formed in an upper end of each diffusion lens 120. A reflective surface 126 for diffusing and reflecting solar light is formed on an inclined circumferential outer surface of each diffusion lens 120. The shape of the incident depression 122 is limited to a special shape, so long as it can appropriately diffuse and refract solar light coming out of the end 22 of the optical fiber 20. In consideration of solar light coming out of the end 22 of the optical fiber 20 at a predetermined light distribution angle, it is advantageous that a shape of the central portion of the incident depression 122 be concave in terms of diffusing and refracting solar light. The reflective surface 126 can be formed by a technique, such as applying, depositing, coating, etc., which are well known in this art.

Preferably, the upper end of the diffusion lens 120 in which the incident depression 122 is formed is disposed below the end 22 of the optical fiber 20 at a position spaced apart from the end 22 by a predetermined distance. In addition, it is preferable that the distance between the end 22 of the optical fiber 20 and the upper end of the diffusion lens 120 be determined after taking all factors including the diameter of the end 22 of the optical fiber 20, the diameter of the upper end of the diffusion lens 120, the shape and size of the incident depression 122, etc. into consideration. In this embodiment, although the hybrid solar light diffuser 100 is illustrated as being made of synthetic resin, it may be made of other materials, so long as they can ensure appropriate diffusion and refraction functions.

Furthermore, in the present invention, a reflective sheet 60 may be provided on a lower surface of the support frame 10, and a side reflector 70 may be provided between a sidewall of the support frame 10 and the hybrid solar light diffuser 100. These two elements may be individually and selectively provided in the solar lighting apparatus 1, and they may be provided together in the solar lighting apparatus 1, of course. When peripheral rays of solar light, of a predetermined light distribution angle or more, that are coming out of the end 22 of the optical fiber 20 are reflected by the reflective surface 126 of the diffusion lens 120, the reflective sheet 60 and the side reflector 70 function to reflect the peripheral rays of light to transmit them to the place desired to be illuminated.

Meanwhile, the present invention may further include an artificial light source 50 which is provided in the support frame 10. In the case of the solar lighting apparatus with the artificial light source 50, it is preferable that the artificial light source 50 be used as an auxiliary light source with respect to the solar light that is transmitted by the optical fibers 10 and is used as the main illumination means. Preferably, the artificial light source 50 comprises a plurality of artificial light sources 50 which are disposed between the optical fibers 20 and are spaced apart from each other at regular intervals. The artificial light sources 50 are controlled by a separate control unit (not shown) and comprise typical LEDs.

Figure 3:
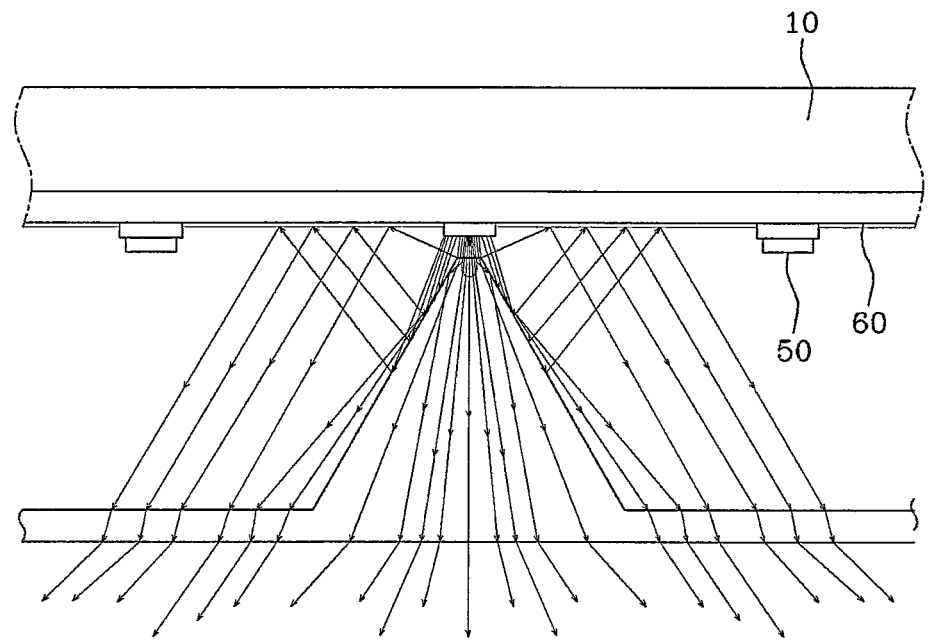
FIG. 3 is a schematic view showing the operation of the solar lighting apparatus according to the present invention.

The operation of the present invention having the above-mentioned construction will be described with reference to FIGS. 2 and 3. Solar light that is collected by the light collector (not shown) is transmitted to the solar lighting apparatus through the optical fibers 20 and then emitted at a predetermined light distribution angle out of the optical fiber ends 22 which are inserted through and fastened to the support frame 10. As shown in the drawings, the major center rays of light of the solar light emitted from each optical fiber end 22 are focused onto the incident depression 122 of the corresponding diffusion lens 120. Peripheral rays of light of the solar light that have a predetermined light distribution angle or more are emitted towards the reflective surface 126 of the diffusion lens 120.

The major portion of the solar light emitted onto the incident depression 122 is refracted on the surface defining the incident depression 122, transmitted through diffusion lens 120, and then transmitted to the place desired to be illuminated below the apparatus via the diffusion plate 160. Meanwhile, of the solar light that is emitted towards the incident depression 122, some rays of light that have a predetermined light distribution angle or more are refracted on the surface defining the incident depression 122 at a predetermined angle or more and then transmitted to the place desired to be illuminated via the reflective surface 126. That is, solar light that has a predetermined light distribution angle and enters the incident depression 122 after being emitted from the optical fiber end 22 is diffused and refracted by the incident depression 122 of the diffusion lens 120 at an angle greater than the incident angle at which the solar light enters the incident depression 122. Thus, some of incident solar light is transmitted to the desired illumination place via the reflective surface 126.

The peripheral rays of solar light that are emitted at a predetermined light distribution angle may directly progress through the air or be reflected by the reflective surface 126 before being transmitted to the desired illumination place via the diffusion plate 160. Unlike this, the peripheral rays of solar light may be successively reflected by the reflective surface 126 and the reflective sheet 60 or by the reflective sheet 60 and the side reflector 70 before being transmitted to the desired illumination place. In other words, rays of solar light that are emitted from the optical fiber end 22 at a predetermined light distribution angle are diffused along a variety of reflection routes and then transmitted to the place desired to be illuminated.

Figure 5:
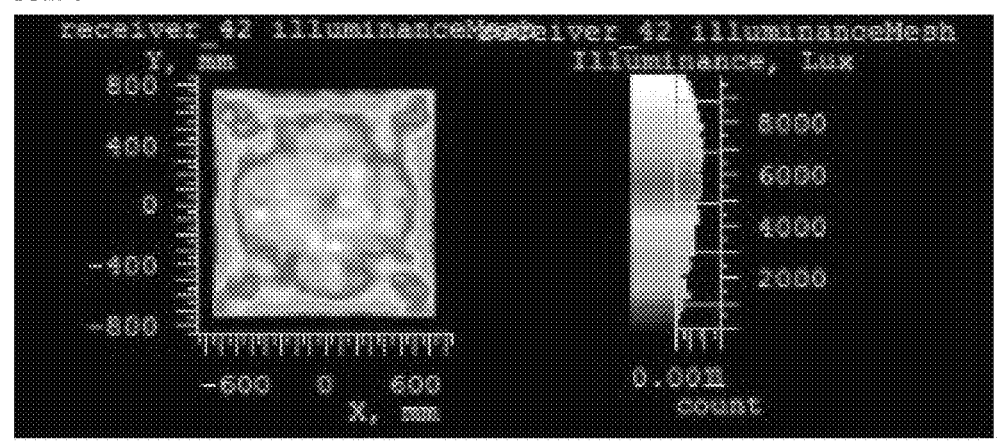
FIGS. 5 through 7 are graphs showing the results of simulations of the solar lighting apparatus of the present invention under various conditions.
Figure 6:
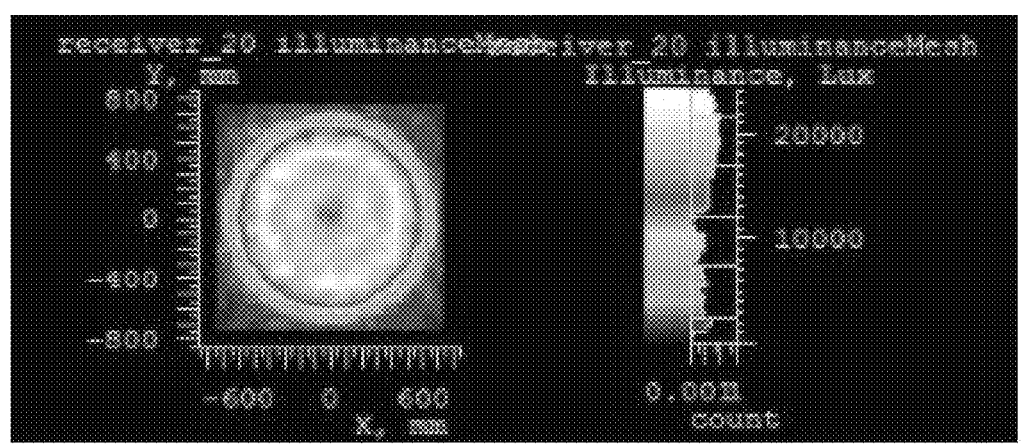
Figure 7:
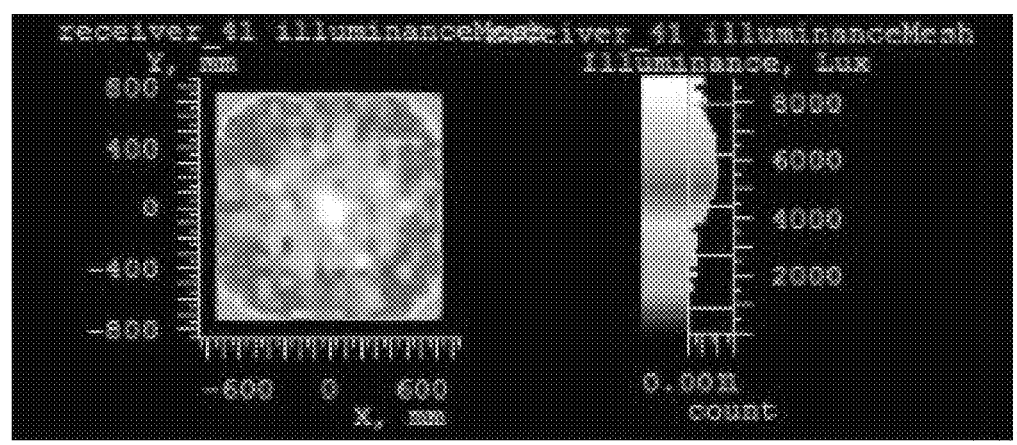

FIGS. 5 through 7 respectively show the results of simulations when the quantity of incident light is 100,000 lumens, and the shape of the diffusion lens, the distance between the optical fiber end and the upper end of the diffusion lens, the height of the diffusion lens and the length of the side (or the diameter) of the bottom of the diffusion lens are, respectively, (a quadrangular pyramidal shape, 7 mm, 5 mm, 30 mm), (a conical shape, 7 mm, 3 mm, 18 mm) and (a conical shape having a curved sidewall, 7 mm, 5 mm, 30 mm). As shown in these drawings, it can be understood that when the hybrid solar light diffuser according to the present invention is used, solar light that is emitted from the optical fiber end at a predetermined light distribution angle is transmitted to the illumination place after being diffused to a great extent.

As described above, a solar lighting apparatus according to the present invention uses a solar light diffuser having an incident depression and a reflective surface and may selectively use a reflective sheet and/or a side reflector. Therefore, solar light that is emitted from an end of an optical fiber at a predetermined light distribution angle can be evenly diffused over the entirety of a place desired to be illuminated.

Furthermore, the present invention may further include an artificial light source to be used as an auxiliary light source. In this case, the solar light and the artificial light source can be used together as a means for illuminating the desired place.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A solar lighting apparatus using optical fibers to transmit solar light for illumination, comprising:
   a support frame installed under a ceiling of a place to be illuminated;
   a plurality of optical fibers inserted through and fastened to the support frame, the optical fibers being spaced apart from each other at regular intervals;
   a hybrid solar light diffuser coupled to a lower portion of the support frame, the hybrid solar light diffuser comprising: a diffusion plate; and a plurality of diffusion lenses provided on the diffusion plate at positions that are spaced apart from each other at regular intervals and correspond to the respective optical fibers, a number of diffusion lenses being equal to a number of optical fibers, each of the diffusion lenses having a width increasing from a top thereof to a bottom, with an incident depression formed in an upper end of each of the diffusion lenses that is spaced apart from an end of the corresponding optical fiber, the incident depression diffusing and refracting solar light, and a reflective surface formed on a circumferential outer surface of each of the diffusion lenses, the reflective surface diffusing and reflecting solar light; and
   a reflective sheet applied to a lower surface of the support frame.

2. The solar lighting apparatus as set forth in claim 1, wherein each of the diffusion lenses has either a conical shape or a polypyramidal shape.

3. The solar lighting apparatus as set forth in claim 1, wherein the circumferential outer surface of each of the diffusion lenses comprises a curved surface.

4. The solar lighting apparatus as set forth in claim 1, wherein the incident depression of each of the diffusion lenses has a concave central portion.

5. The solar lighting apparatus as set forth in claim 1, further comprising:
   a side reflector provided between a sidewall of the support frame and the hybrid solar light diffuser.

6. The solar lighting apparatus as set forth in claim 1, further comprising:
   a plurality of artificial light sources in the support frame at positions spaced apart from each other at regular intervals.

* * * * *